United States Patent [19]
Shinohara et al.

[11] 3,933,717
[45] Jan. 20, 1976

[54] WATER SOLUBLE LINEAR MACROAMINE POLYMERS AND METHOD OF PRODUCING THEM

[75] Inventors: Isao Shinohara; Juro Aoyagi, both of Tokyo, Japan

[73] Assignee: B. R. Chemical Co., Ltd., Tokyo, Japan

[22] Filed: June 17, 1974

[21] Appl. No.: 479,631

Related U.S. Application Data

[63] Continuation-in-part of Ser. No. 323,731, Jan. 18, 1973, abandoned, Continuation-in-part of Ser. No. 345,122, March 26, 1973, abandoned.

[30] Foreign Application Priority Data

Jan. 25, 1972 Japan.................................. 47-8729
Mar. 28, 1972 Japan................................ 47-30334

[52] U.S. Cl. ..... 260/29.6 R; 210/54; 260/29.6 MN; 260/92.8 R; 260/42.8 A
[51] Int. Cl.² ................... C08L 23/00; C08F 114/02; C08F 114/16
[58] Field of Search . 260/89.7 N, 92.8 R, 29.6 MN, 260/29.6 R, 92.8 A; 210/54

[56] References Cited
UNITED STATES PATENTS

| | | |
|---|---|---|
| 2,315,734 | 4/1943 | Ralston et al.................... 210/54 X |
| 2,807,910 | 10/1957 | Erickson............................ 210/54 |

Primary Examiner—Joseph L. Schofer
Assistant Examiner—Herbert J. Lilling
Attorney, Agent, or Firm—Fulbright & Jaworski

[57] ABSTRACT

A novel macroamine polymer particularly useful as a flocculating agent, said polymer having a structural unit shown by the following formula:

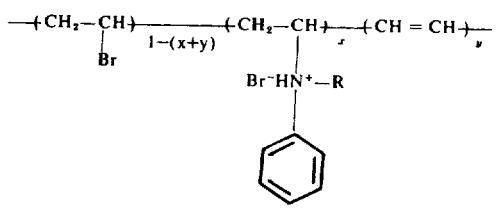

wherein R represents an alkyl group containing 1 to 4 carbon atoms, $x$ is a mol decimal fraction between about 0.65 and 0.95, and $y$ is a mol decimal fraction between about 0.23 and 0.04. Said polymer can be obtained by reacting polyvinyl bromide with an N-monoalkylaniline having 1 to 4 carbon atoms in the alkyl group.

13 Claims, 2 Drawing Figures

WATER SOLUBLE LINEAR MACROAMINE POLYMERS AND METHOD OF PRODUCING THEM

CROSS-REFERENCES TO RELATED APPLICATIONS

This is a continuation-in-part of two U.S. applications filed by the same inventors, Isao Shinohara and Juro Aoyagi, in Group Art Un. 140. Those applications, of which this is a continuation-in-part, are U.S. Pat. application Ser. No. 323,731 filed Jan. 18, 1973 and now abandoned, for Macroamine Polymers and Method of Producing Them, and U.S. patent application Ser. No. 345,122 filed Mar. 26, 1973 and now abandoned, for High Molecular Flocculating Agent.

BACKGROUND OF THE INVENTION

The present invention relates to a novel water-soluble linear macroamine polymer and a method of preparing the same and its use as a flocculating or coagulating agent in clarifying, precipitating and decoloring water. More particularly, this polymer is one having at least about 65 mol percent amine content and not greater than about 23 mol percent polyene content, and a method of preparing the same. Further, it relates to a novel macroamine polymer in which amino groups are introduced to the polymer matrix by the reaction of one or more of certain N-monoalkylanilines with polyvinyl bromide.

A number of detailed researches have been made up to now with respect to reaction of polyvinyl chloride with a variety of compounds. However, the reactivity in these reactions is so small that it has been difficult to introduce amino groups to a satisfactory extent. For instance, when polyvinyl chloride is reacted with an amine, the degree of the introduction of the amine to the polymer matrix under ordinary reaction conditions reaches the level of only about 2.6 to 10%. See, for example, D. Hummel; "Plaste Und Kautschuk", Volume 9, No. 11, pages 532–5 (1962), East Germany. Further increase in the degree of introduction does not occur even by carrying out the reaction over longer periods of time and because the result is the promotion of the formation of polyenes by dehydrohalogenation rather than the introduction of the amine.

It has been known in the art that some inorganic-type and high molecular-type flocculating or coagulating agents are effective for use in waste water disposal.

The inorganic-type flocculating agent exhibits its activity mainly by lowering the electric charge of the surface of substance suspended in water to be disposed.

On the other hand, the high molecular-type flocculating agent exerts such functions, besides the above-mentioned function, as adsorption of suspended substance at the active site on the polymer, or by agglomeration due to cross-linking reaction, none of which can be attained upon the use of the inorganic flocculating agent alone. Therefore, it is clear that the high molecular flocculating agent has much more advantageous features than inorganictype one, in (a) its strong flocculating ability even with the use of less quantity and (b) its capability of forming large-sized floc.

As a result, the high mulecular flocculating agent can quicken the precipitating or floating speed as well as filter-ring or drying speed, etc., and serves for shortening the requisite time of disposal and for increasing the capacity of disposal while reducing the amounts of sludges and cakes formed, to thereby contribute to the rationalization of waste water disposing procedures.

In spite of such advantageous features which might be expected to be helpful for the rationalization of disposing procedures, conventional high mulecular flocculating agents are not yet satisfactory for use in waste water disposal. In case of disposing waste water containing suspended colloidal organic solids, for instance, it is generally noticed that a cationic polymer has remarkably excellent ability in clarifying activity, whereas satisfactory result has not always been obtained especially with respect to the ability of forming coarse or large-sized floc which is expected as one of inherent advantages accompanied by the use of a high mulecular-type flocculating agent.

This is not essentially attributable to the nature of a cationic polymer, but to the great difficulty in the production of such a cationic polymer having a polymerization degree sufficiently high to form coarse floc.

Certain anionic and nonionic type high molecular flocculating agents with high degree of polymerization are availble in the art, but they do not exhibit satisfactory effect unless they are used in combination with an inorganic-type floccuating agent.

The reason is due to the fact that anionic or nonionic type high mulecular flocculating agents behave as a floc-growing agent rather than exerting the function of flocculation by the neutralization of the electric charge of suspended colloidal substance.

Other than the polymer of the present invention, we know of no high molecular flocculating agent available in the art which provides clarifying, precipitating and decoloring functions at the same time, and is capable of exhibiting remarkably excellent effect as a single agent. The clarifying and decoloring properties of conventional high molecular flocculating agents were only derived subsidiarily by the result of the agglomeration and precipitation.

Accordingly, such a conventional-type high molecular flocculating agent has a drawback such that it is almost ineffective for the decoloration of a colored system occurring due to completely dissolved substance therein.

It is a general object of the present invention to provide a novel macroamine polymer which is water-soluble, has a high amine content and is useful as a flocculating or coagulating agent to remove certain impurities from water. Further objects of the present invention are to provide a method of preparing that macroamine polymer and of its use in clarifying, precipitating and decoloring activities with respect to water.

Other and further objects, features and advantages will be apparent from the following description of the invention given for the purpose of disclosure.

The present invention is based upon the creation of a certain linear macroamine polymer, the development of a method for producing the polymer, and the discovery that the polymer is particularly useful as a flocculating agent to assist in the removal of certain material from water. The polymer has a structural unit showing by the following formula:

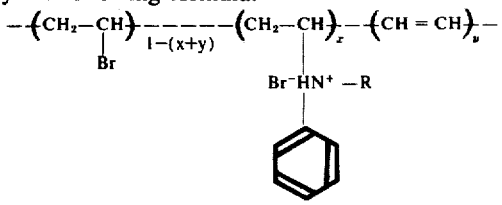

wherein R represents an alkyl group containing 1 to 4 carbon atoms, $x$ is a mol decimal fraction between about 0.65 and 0.95, and $y$ is a mol decimal fraction between about 0.23 and 0.04. Preferably $x$ is between about 0.80 and 0.95 and $y$ is between 0.23 and 0.04.

This linear macroamine polymer can be prepared by reacting polyvinyl bromide with an N-monoalkylaniline having 1 to 4 carbon atoms in the alkyl group.

The polyvinyl bromide to be used is not limited to any specific type and may be conveniently produced in accordance with conventional processes such as mass polymerization, emulsion polymerization, solution polymerization and photo polymerization. The polyvinyl bromide usually will have a molecular weight ranging from about 1,000 to 300,000, and preferably between about 10,000 and 150,000.

The preferred N-monoalkylaniline is N-methylaniline.

The macroamine polymer of the present invention may be prepared by mixing the polyvinyl bromide and the N-monoalkylaniline and stirring the reactants while heating under an atmosphere of an inert gas such as nitrogen or argon. The reaction of the polyvinyl bromide with the N-monoalkylaniline is usually carried out at temperatures ranging from 80° to 250° C., preferably between about 120° and 180° C., for a period of a few minutes up to 24 hours, preferably from 5 to 15 hours. The reaction proceeds well at atmospheric pressure although superatmospheric conditions may be used if desired.

The N-monoalkylaniline not only participates in the reaction as an aminating agent, but also serves as an excellent solvent for the polyvinyl bromide. The polyvinyl bromide dissolves in the N-monoalkylaniline promptly after it has been added, and the reaction takes place readily when the resulting mixture is heated.

If desired, the reaction can be carried out in the presence of polar solvents such as tetrahydrofuran, dioxane, dimethylformamide, diethylforamide and dimethyl sulfoxide.

The quantity of N-monoalkylaniline which should be used is more than the chemical equivalent to the polyvinyl bromide and preferably about 3 to 20 times greater than that equivalent. The use of greater amounts of alkylaniline does not cause deterioration of the reaction, but is wasteful. On the other hand, the use of an alkylaniline below the chemical equivalent of the polyvinyl bromide is not desirable since it does not create sufficient amination of the polyvinyl bromide and requires a greater amount of solvent.

After the reaction of the polyvinyl bromide with the N-monoalkylaniline has been carried out to the desired extent, the resulting macroamine polymer can be separated from the unreacted alkylaniline in an appropriate manner. For instance, the polymer is separated from the remaining constituents by adding to the reaction products an inert material in which the polymer is insoluble, but in which the other materials are soluble. Examples of this material are ethyl acetate, isopropyl acetate, ethyl ether, petroleum ether, isopropanol, n-butanol, acetone, diethyl ketone and methyl ethyl ketone. This will result in a precipitation of the polymer which may be subsequently recovered by filtration. The precipitated polymer may be purified, if desired, by washing with alkali and thereafter rinsing with water and drying.

The macroamine polymer thus produced contains a large proportion of the alkylaniline. It has been found when the mol percent of the alkylaniline in the polymer reaches at least about 65%, that the macroamine polymer becomes water soluble. The macroamine polymer, when it is used as a flocculating agent, needs to be soluble in water so that it will easily dissolve in industrial waste water and other aqueous bodies upon its addition thereto and be able to combine with dissolved or suspended substances in the waste water to effect clarification, precipitation and decolorization, and finally settle them from the water.

If the macroamine polymer has less than about 65 mol percent alkylaniline, the polymer is insoluble in water and does not function satisfactorily as a flocculating agent. When the amount of alkylaniline is between about 80 and 95 mol percent, the polymer exhibits excellent results in the clarifying, precipitating or decoloring activity.

The water-soluble macroamine polymer of the present invention reacts readily with metallic ions such as sodium, potassium, magnesium, calcium, aluminum, copper, silver, gold, zinc, cadmium, mercury, titanium, tin, lead, chromium, molybdenum, manganese, iron, cobalt, nickel, platinum, etc. and promptly forms a precipitate with them. Although we do not completely understand the mechanism of the reactions of this macroamine polymer with metallic ions, we believe that what occurs is that these cationic substances form chelates with the macroamine polymer.

Also, in an acidic solution, this macroamine polymer will react with some anionic substances and form precipitates. Here again, the exact nature of the precipitate or the reactions that occur is not known, but it is thought that the precipitates are salts, complexes or cross-linked products.

Since these salts, complexes, cross-linked products and chelates are insoluble in water, they precipitate as they form, and thereby remove suspended or dissolved substances from the water.

If desired, the polymer can be regenerated from the reaction product of the polymer with the cations by dissolving the reaction product in an acidic aqueous solution (pH between about 1 and 5), preferably having a pH between about 1 and 3.

The macroamine polymer of this invention has both a high molecular weight and a high content of the amino group, and as a result the polymer serves as a flocculating agent with even minor concentrations of cations. It, therefore, is particularly useful for the treatment of various types of waste water, drainage or other aqueous solutions.

DESCRIPTION OF THE PREFERRED EMBODIMENTS

Figure 1:
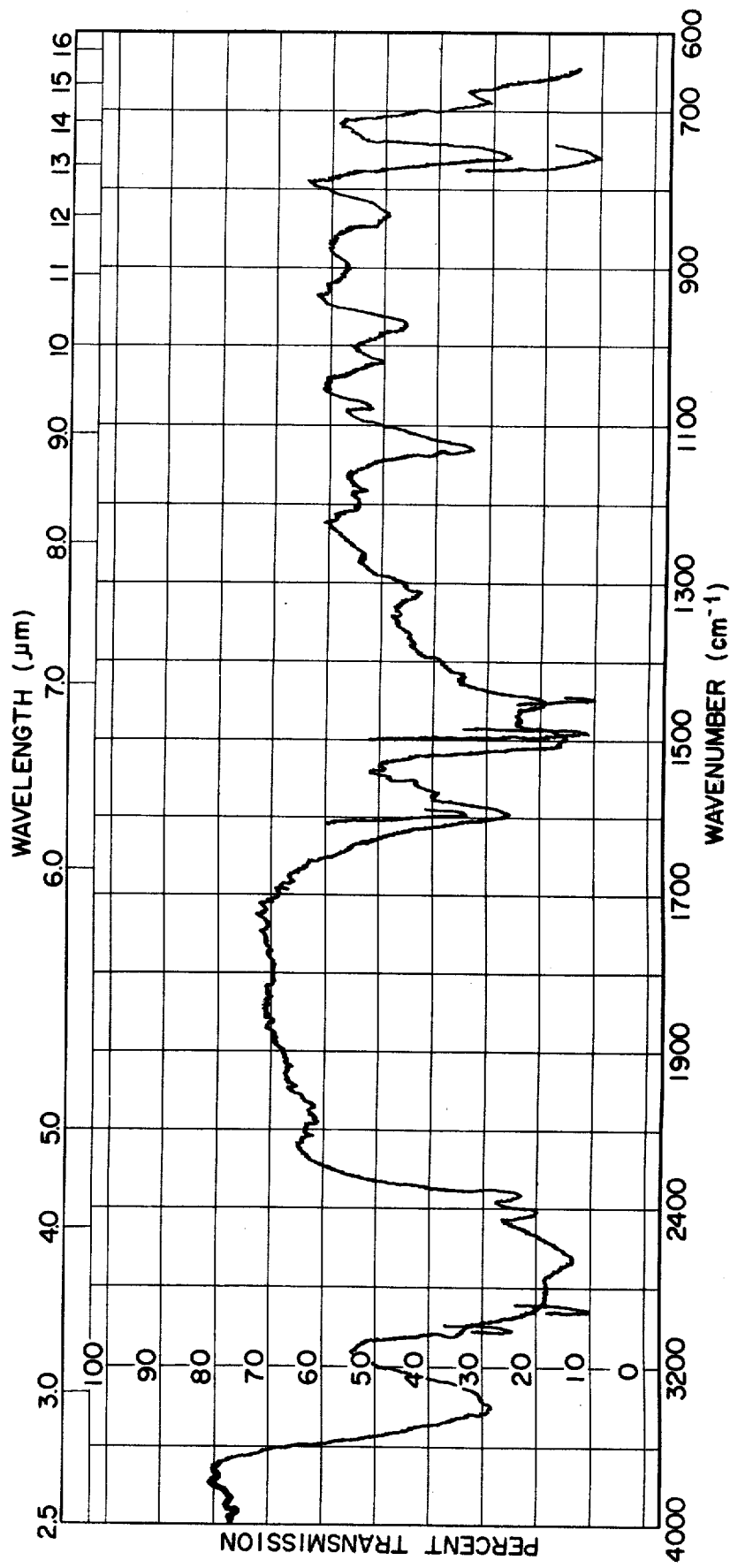
FIG. 1 illustrates a chart of infrared absorption spectrum of the macroamine polymer according to the present invention, wherein R is methyl group.
Figure 2:
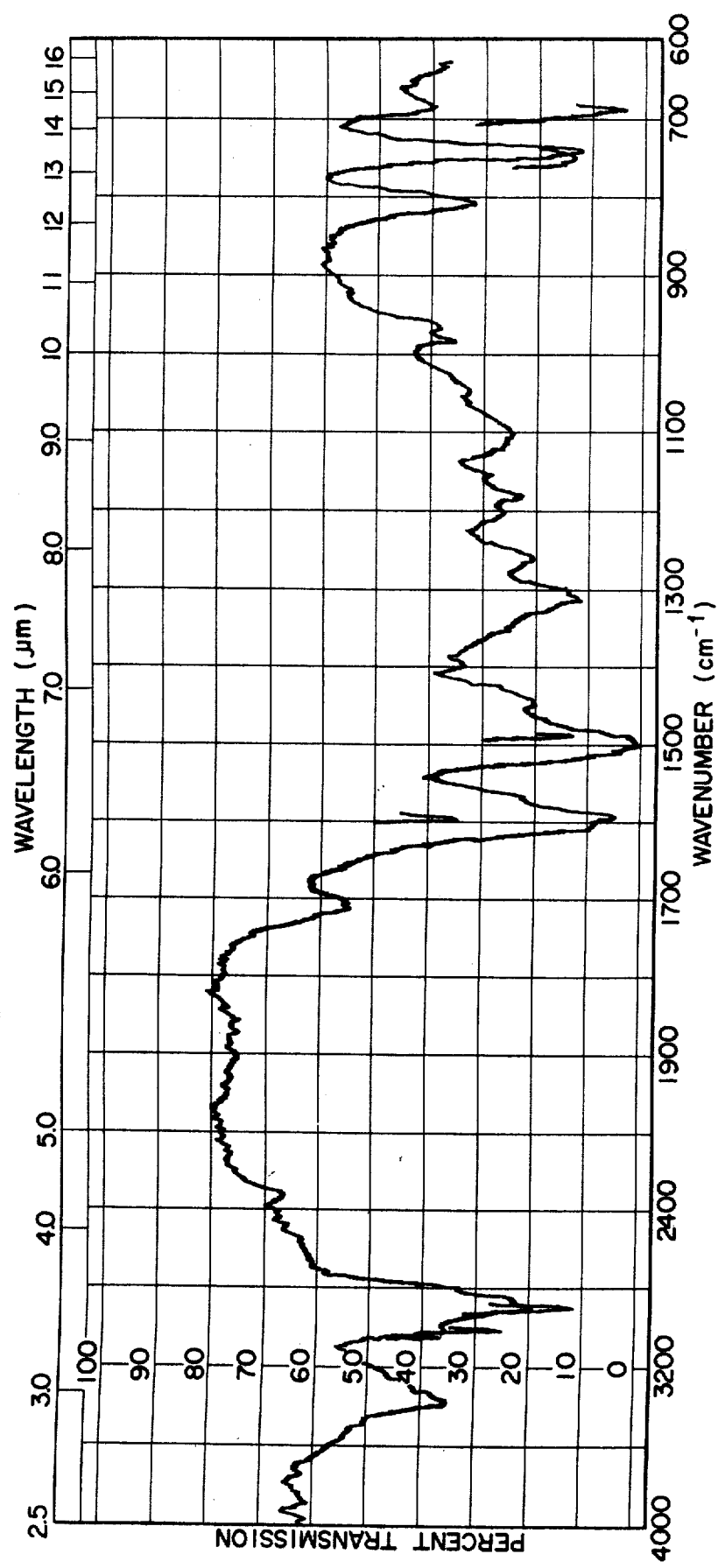
FIG. 2 illustrates a chart of infrared absorption spectrum of the above-described polymer treated with alkali.

The macroamine polymer according to the present invention has the structural unit shown above. This is confirmed by the chart of infrared absorption spectrum and by elementary analysis. FIG. 1 illustrates a chart of infrared absorption spectrum of the macroamine polymer obtained by reacting polyvinyl bromide with N-methylaniline at a temperature of 150° C. for 8 hours. According to the spectrum, characteristic absorption based on $\nu_{NH}+$ of tertiary amine is recognized at 2,700 to 2,250 cm$^{-1}$, while the characteristic absorption is not recognized at the abovedescribed wave range according to FIG. 2 which is an infrared absorption spectrum of the polymer treated with ammonia. Two characteristic absorptions based on $\nu$ N–CH$_3$ at 2,810 to 2,805 cm$^{-1}$ and $\nu$ C–N of tertiary amine at 1,210 to 1,070 cm$^{-1}$ are recognized respectively without regard to alkali treatment. And characteristic absorptions of polyene are also recognized at 1,600 cm$^{-1}$.

From a result of the infrared absorption spectrum, it is presumed that a reaction of polyvinyl bromide with N-monoalkylaniline proceeds as the following equation:

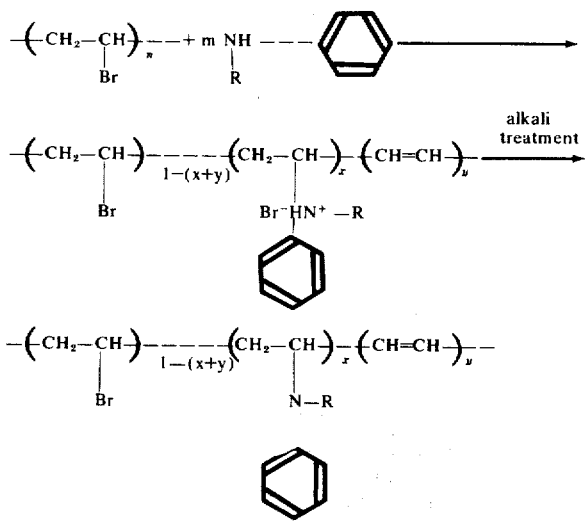

wherein R represents alkyl group containing 1 to 4 carbon atoms, $n$ represents polymerization degree, $m$ represents moles of N-monoalkylaniline, $x$ is between about 0.65 and 0.95, and $y$ is between about 0.23 and 0.04. Thus, between the elemental composition of the macroamine polymer shown by the above formula and $x$ and $y$, there exists the following set of equations:

$$N(weight\%) = \frac{x[N]}{[C_2H_3Br]+x[RN-\bigcirc]-(x+y)[HBr]} \times 100$$

$$C(weight\%) = \frac{\{2+(6+\text{the number of carbon atoms in the alkyl group R})\cdot x\}\cdot[C]}{[C_2H_3Br]+x[RN-\bigcirc]-(x+y)[HBr]} \times 100$$

wherein formulas in the brackets represent atomic or molecular weight.

In the present invention, a proportion of introduced N-monoalkylaniline and a degree of double bond formation were determined respectively by the above equations using the quantities of nitrogen and carbon determined by elementary analysis. Furthermore, the degree of double bond formation was determined directly, and the results thus obtained were compared with the results calculated by the elementary analysis value. Both results corresponded. Hence, the degree of double bond formation obtained by calculating the elementary analysis value is thought to be proper.

The polymer of the present invention is especially useful for the disposal of various types of waste water or drainage, such as those drained from iron works, aluminum processing works, dyeing works, pulp and paper-making works, salt electrolyzing works and the like other industrial waste water; for the purification of city water, sewage, etc., and for the recovery of metals from catalysts, electrolytes, etc.

Following are several specific examples of the present invention.

EXAMPLE 1

A four-necked flask having a capacity of one liter fitted with a stirrer, thermometer, reflux condenser and nitrogen feed pipe was charged with 200.0 grams N-methylaniline, and heated under an atmosphere of nitrogen. When the liquid temperature reached 150° C., there was introduced 10 grams of polyvinyl bromide (produced by emulsion polymerization process, having numerical average molecular weight, measured by viscosity method, of 134,000) to the flask, and the reaction was conducted under stirring at that temperature for 8 hours. After the completion of the reaction, an excess of ethyl acetate was added to thereby precipitate the polymer which was then separated by filtration. The polymer so obtained was washed with water and dried in vacuum at room temperature until the weight became constant.

The aminated polymer obtained in this way was analyzed by means of elementary analysis, halogen analysis and infrared absorption spectrum methods. The proportion of N-methylaniline introduced was 82.00% and the degree of double bond formation was 8.12%. The polymer so formed was found to be completely soluble in water. The chart of the infrared absorption spectrum is as FIG. 1.

EXAMPLE 2

The procedure of Example 1 was repeated except that the reaction was carried out for a period of 5 hours. The proportion of the introduction of N-methylaniline in the water-soluble polymer so obtained was 70.12% and the degree of the formation of double bond was 22.21%.

EXAMPLE 3

The procedure of Example 1 was repeated except that the reaction was carried out for a period of 12 hours. The introduction of N-methylaniline in the resulting water-soluble polymer was 91.00% and the degree of double bond formation was 5.12%.

EXAMPLE 4

The procedure of Example 1 was repeated except that 100.0 grams of N-methylaniline was used instead of 200.0 grams of N-methylaniline. The introduction of N-methylaniline in the resulting water-soluble polymer was 81.0% and the degree of double bond formation after the reaction was 9.02%.

EXAMPLE 5

A four-necked flask same as that used in Example 1 was charged with 170.0 grams of N-ethylaniline and heated under an atmosphere of nitrogen gas. When the temperature of the reaction liquid reached 150° C., 10.0 grams of polyvinyl bromide (having an average molecular weight of 134,000) was continuously added and the reaction carried out at that temperature for 10 hours.

After completion of the reaction, the reaction mixture was treated in a manner similar to that employed in Example 1. Analysis of the resulting water-soluble polymer showed an N-ethylaniline introduction of 75.00% and the degree of double bond formation to be 10.12%.

EXAMPLE 6

The procedure of Example 5 was repeated except 252.66 grams of N-isopropylaniline was used instead of N-ethylaniline. The introduction of N-isopropylaniline in the resulting watersoluble polymer was 73.15% and the degree of double bond formation was 15.03%.

EXAMPLE 7

The procedure of Exampple 5 was repeated except that 278.83 grams of N-n-butylaniline was used instead of N-ethylaniline. The introduction of N-n-butylaniline was 79.2% and the degree of double bond formation was 21.8%.

EXAMPLE 8

To 300 ml. of aqueous bentonite suspension at the concentration of 100 ppm., each high macroamine polymer obtained in Examples 1 to 3 and 5 was added in a given proportion. Each suspension was subjected to stirring at a rotation speed of 130 r.p.m. for the first 5 minutes, then at a rotation speed of 30 r.p.m. for a further 5 minutes. After the completion of stirring, each solution was allowed to stand still for 5 minutes and the supernatent liquid was carefully collected. The turbidity of the supernatent was determined with the use of a turbidmeter (or nephelometer) to measure remaining turbidity.

The results obtained are shown in Table 1.

Table 1.

| Polymer of | Amount of Macroamine Polymer Added (ppm) | | | | |
|---|---|---|---|---|---|
| | 0.5 | 1.0 | 2.0 | 4.0 | 8.0 |
| | Remaining Turbidity in Degrees | | | | |
| Example 1 | 0.6 | 0.3 | 0.2 | 0.2 | 0.2 |
| Example 2 | 22.8 | 18.4 | 15.1 | 8.4 | 5.3 |
| Example 3 | 0.3 | 0.2 | 0.1 | 0.1 | 0.1 |
| Example 5 | 2.5 | 1.6 | 0.9 | 0.7 | 0.6 |

EXAMPLE 9

To 100 ml. of an aqueous solution containing 100 ppm. of a dyestuff (Amaranth), there was added 1% solutions of each of the macroamine polymer obtained in Examples 1, 2 and 3 with thorough stirring. The mixture was then stirred mildly so as to effect the growth of floc formed. The solution was filtered with the use of a No. 1 filter paper and the concentration of remaining dyestuff in the solution was measured by the use of a photoelectric colorimeter. The results obtained are given in Tables 2 and 3.

Table 2.

| | Amount of Macroamine Polymer Added (ppm) | | | |
|---|---|---|---|---|
| | 300 | 350 | 400 | 500 |
| | Remaining Dye Concentration in ppm. | | | |
| Polymer of Example 2 | 13.0 | 2.5 | 1.3 | 0.8 |

Table 3.

| | Amount of Macroamine Polymer Added (ppm) | | | |
|---|---|---|---|---|
| | 100 | 120 | 150 | 180 |
| | Remaining Dye Concentration in ppm | | | |
| Polymer of Example 1 | 1.3 | 0.9 | 0.8 | 0.5 |
| Polymer of Example 3 | 0.8 | 0.5 | 0.3 | 0.2 |

EXAMPLE 10

It is similar to Example 9, but the dyestuff was Yellow No. 1 (Tartrazine) and the only polymer used was the polymer of Example 1. The results are given in Table 4.

Table 4.

| Amount of High Molecular Flocculating Agent Added (ppm) | 100 | 120 | 150 | 180 |
|---|---|---|---|---|
| Concentration of Remaining Dyestuff (ppm) | 1.3 | 0.8 | 0.5 | 0.3 |

EXAMPLE 11

In the same manner as Example 9 except using an aqueous solution of dyestuff Blue No. 1 (Brilliant Blue) at the concentration of 100 ppm. and only the polymer produced in Example 1, the remaining dye concentration was measured. The results obtained are given in Table 5.

Table 5.

| High Molecular Flocculating Agent Added (ppm) | 100 | 120 | 150 | 180 |
|---|---|---|---|---|
| Concentration Pigment (ppm) | 2.1 | 1.3 | 1.0 | 0.8 |

EXAMPLE 12

300 ml. of aqueous bentonite suspension with a concentration of 100 ppm. was placed in a settling tube, to which the polymers obtained in Examples 1 to 3 and 5 were added respectively at predetermined proportions. The settling tube was turned upside down quickly twice and slowly eight times. The settling tube was then stood still and the speed of falling boundary layer (interfacial layer) between floc layer and aqueous layer was measured. Results obtained by measuring the settling speed of boundary surface of the region between 2 cm down the water level and 10 cm up the bottom are given in Table 6.

Table 6.

| Type of High Molecular Flocculating Agent Used | (settling speed: cm/min.) Amount of High Molecular Flocculating Agent Added (ppm) | | | | | |
|---|---|---|---|---|---|---|
| | 0.25 | 0.35 | 0.5 | 1.25 | 2.5 | 5.0 |
| Example 1 | 1.00 | 1.01 | 1.21 | 1.41 | 1.61 | 1.81 |
| Example 2 | 0.25 | — | — | 0.25 | 0.26 | 0.26 |
| Example 3 | 1.54 | 1.89 | 2.45 | 2.98 | 3.27 | 3.53 |
| Example 5 | 0.88 | — | 1.22 | 1.43 | 1.56 | 1.62 |

It will be apparent from the above results that the polymer of the present invention exhibits excellent flocculating or coagulating properties.

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. A water soluble linear macroamine polymer consisting essentially of a structural unit shown by the following formula:

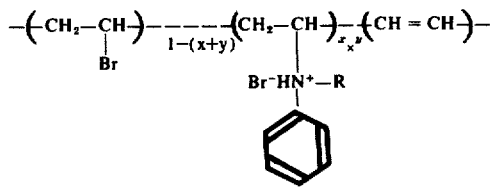

wherein R represents alkyl group containing 1 to 4 carbon atoms, $x$ is a mol decimal fraction between about 0.65 and 0.95, and $y$ is a mol decimal fraction between about 0.23 and 0.04.

2. A macroamine polymer according to claim 1 wherein $x$ is between 0.80 and 0.95.

3. A macroamine polymer according to claim 1 wherein R is the methyl group.

4. A macroamine polymer according to claim 1 wherein R is the ethyl group.

5. A macroamine polymer according to claim 1 wherein R is the isopropyl group.

6. A method of preparing a water-soluble linear macroamine polymer which comprises reacting polyvinyl bromide with N-monoalkylaniline having 1 to 4 carbon atoms in the alkyl group at temperatures between about 80° and 250° C.

7. A method according to claim 6 wherein the reaction occurs at temperatures between about 120° and 180° C.

8. A method according to claim 6 wherein the equivalent ratio of the N-monoalkylaniline to polyvinyl bromide is between about 3 and 20.

9. A method according to claim 8 wherein N-monoalkylaniline is N-methylaniline.

10. A method according to claim 8 wherein N-monoalkylaniline is N-ethylaniline.

11. A method according to claim 8 wherein N-monoalkylaniline is N-isopropylaniline.

12. A method according to claim 8 wherein N-monoalkylaniline is N-n-butylaniline.

13. An aqueous solution of the water-soluble linear macroamine polymer of claim 1.

* * * * *